United States Patent [19]

Yoshizawa et al.

[11] E Patent Number: Re. 32,626

[45] Reissued Date of Patent: Mar. 22, 1988

[54] MICROWAVE GENERATED PLASMA LIGHT SOURCE APPARATUS

[75] Inventors: Kenji Yoshizawa, Hyogo; Hitoshi Kodama, Kanagawa; Yoshibumi Minowa, Hyogo; Hiroshi Ito, Kanagawa; Hirotsugu Komura, Fukuoka, all of Japan

[73] Assignee: Mitsubishi Denki Kabushiki Kaisha, Tokyo, Japan

[21] Appl. No.: 932,416

[22] Filed: Nov. 20, 1986

Related U.S. Patent Documents

Reissue of:

[64] Patent No.: 4,498,029
Issued: Feb. 5, 1985
Appl. No.: 625,565
Filed: Jul. 2, 1984

U.S. Applications:

[63] Continuation of Ser. No. 242,075, Mar. 9, 1981, abandoned.

[30] Foreign Application Priority Data

Mar. 10, 1980 [JP] Japan ..... 55-29911

[51] Int. Cl.[4] ..... H01J 7/46; H01J 17/80

[52] U.S. Cl. ..... 315/39; 315/248; 315/111.21; 313/231.31

[58] Field of Search ..... 315/39, 248, 111.21, 315/111.31; 313/231.31, 231.41

[56] References Cited

U.S. PATENT DOCUMENTS

| | | | |
|---|---|---|---|
| 3,374,393 | 3/1968 | Bramley | 315/39 |
| 3,541,372 | 11/1970 | Omura et al. | 315/39 |
| 3,609,448 | 9/1971 | Williams | 315/39 |
| 3,641,389 | 3/1972 | Leidigh | 315/39 |
| 3,648,100 | 3/1972 | Goldie et al. | 315/39 |
| 3,787,705 | 1/1974 | Bolin et al. | 315/248 |
| 3,872,349 | 3/1975 | Spero et al. | 315/39 |
| 3,911,318 | 10/1975 | Spero et al. | 315/39 |
| 4,001,632 | 1/1977 | Haugsjaa et al. | 315/39 |
| 4,042,850 | 8/1977 | Ury et al. | 315/39 |
| 4,175,246 | 11/1979 | Feinberg et al. | 315/101 |
| 4,189,661 | 2/1980 | Haugsjaa et al. | 315/39 |

FOREIGN PATENT DOCUMENTS

| | | | |
|---|---|---|---|
| 54-82876 | 7/1979 | Japan | 315/248 |

*Primary Examiner*—Saxfield Chatmon
*Attorney, Agent, or Firm*—Sughrue, Mion, Zinn, Macpeak & Seas

[57] ABSTRACT

A microwave generated plasma light source including a microwave generator, a microwave cavity having a light reflecting member forming at least a portion of the cavity, and a member transparent to light and opaque to microwaves disposed across an opening of the cavity opposite the feeding opening through which the microwave generator is coupled. An electrodeless discharge bulb is disposed at a position in the cavity such that the cavity operates as a resonant cavity at least when the bulb is emitting light. In the bulb is encapsulated at least one discharge light emissive substance. The bulb has a shape and is sufficiently small that the bulb acts substantially as a point light source.

34 Claims, 23 Drawing Figures

MICROWAVE GENERATED PLASMA LIGHT SOURCE APPARATUS

Matter enclosed in heavy brackets [ ] appears in the original patent but forms no part of this reissue specification; matter printed in italics indicates the additions made by reissue.

This application *is a reissue of U.S. Pat. No. 4,498,029, which* is a continuation of application Ser. No. 242,075, filed 3/9/81, now abandoned.

BACKGROUND OF THE INVENTION

The present invention relates to a light source utilizing a microwave generated plasma discharge.

Recently, a light source utilizing high frequency discharge, particularly, a microwave generated plasma discharge, has been considered in view of the long life thereby provided, which is significantly longer than the life of a conventional light source having electrodes which are relatively easily consumed.

A light source using high frequency discharge has essentially no electrode and thus there is no thermal loss such as is inherent to a light source having electrodes. Further, the discharge impedance thereof at the time when discharge starts is not significantly different from that during the stable discharge. In addition to these advantages, since discharge power is localized around an envelope of the lamp bulb, it is easy to couple power to the light source at the discharge starting time. Thus, the time required to achieve the maximum lamp output is short.

FIG. 1 shows, in vertical cross section, a conventional microwave generated plasma light source constructed by incorporating the above features and FIG. 2 is a cross section of the light source taken along a line II—II in FIG. 1.

In these Figures, a magnetron 1 enclosed by an envelope 10 and cooled by a cooling fan 7 generates microwave energy which is radiated through a magnetron antenna 2 into a waveguide tube 3. The microwave energy propagates along the waveguide tube 3 and is radiated through a feeding opening 5 to a cavity 49 having a semicircular cross section and defined by a mesh 9 and a semicircular light reflector 4 having a plurality of gas passages formed therein to thus establish a microwave electromagnetic field therein. A discharge occurs in a noble gas encapsulated in a discharge bulb 6 due to the microwave electromagnetic field to thus heat the bulb wall or envelope and to thereby evaporate a metal such as mercury also encapsulated in the bulb. Then, discharge in the gaseous metal takes place. With this gaseous metal discharge, the microwave energy is caused to be absorbed by the discharge bulb 6 substantially completely during its propagation along the length of the discharge bulb 6 through several reflections within the cavity 49 so that the microwave energy is converted into discharge energy substantially completely. That is, the bulb is excited in a non-resonance state.

The reflector 4 defining a portion of the cavity 49 reflects light directed rearwardly of the lamp bulb so that all the light from the bulb is directed to pass through an open end of the cavity which is covered by a mesh member 9 which is transparent to light but only translucent to microwaves to thereby utilize the light produced by the gaseous metal discharge effectively.

Cooling air supplied by the fan 7, after cooling of the magnetron 1, passes through the air passages 8 of the reflector 4 to cool the discharge bulb 6 and is discharged from the cavity 49 through the mesh member 9.

In the conventional microwave generated plasma light source constructed as above, the microwave electromagnetic waves are distributed in the cavity 49 having a semicircular cross section as shown in FIG. 3. However, the distribution is not uniform. Therefore, the discharge in the discharge bulb 6 is not uniform and thus the light intensity distribution is not uniform in the axial direction of the bulb.

One approach of eliminating the non-uniformity of light intensity distribution is to alter the shape of, for example, the reflector 4. This approach, however, is not practical because it is difficult as a practical matter to provide a reflector of a shape corresponding to the microwave electric field distribution in the cavity. Another approach is to use as small a discharge bulb as possible to thereby obtain a uniform discharge. Since, in this case, however, the cavity 49 is used in the non-resonance state, it is impossible to supply sufficient power to the discharge bulb 6 to excite it resulting in a low discharge efficiency. Therefore, the device thus constructed is not suitable for use as an ultraviolet ray source for photographic plate making where a high light intensity and a highly uniform illumination distribution over an area to be illuminated are required.

SUMMARY OF THE INVENTION

An object of the present invention is to provide a microwave generated plasma light source apparatus with which a uniform illumination distribution is provided and which is suitable for use as an ultraviolet ray source, for example for a photographic plate making device.

The above object is achieved by the present invention by the use of a microwave cavity as a resonator when the discharge bulb is operated and by selecting the shape of the discharge bulb so that it functions as a point light source.

More specifically, the above and other objects of the invention are met by a microwave generated plasma light source apparatus including a microwave generator, a microwave cavity having a light reflecting member forming at least a portion of the cavity with the microwave generator being coupled through a feeding opening in the cavity to the cavity, a member transparent to light and opaque to microwaves disposed across an opening of the cavity opposite the feeding opening, a waveguide for guiding microwaves generated by the microwave generator to the feeding opening of the cavity, and a non-electrode discharge bulb disposed at a position in the cavity such that the cavity operates as a resonant cavity at least when the bulb is emitting light. The bulb encapsulates at least one discharge light emissive substance and has a shape and is sufficiently small that the bulb functions substantially as a point light source, taking into consideration the size and shape of the light reflecting member.

Preferably, the light reflecting member is a light reflecting shell having rotational symmetry. At least a portion of the light reflecting shell may conform to the shape of the bulb and a wing portion may be provided extending from a peripheral edge of the shell and an inner surface of the wing portion is made non-reflective to light. A lens may be provided for collecting or scattering light passing through the member which is transparent to light and opaque to microwaves. An electrically conductive discharge start assisting member may be disposed at least in the vicinity of the bulb for concentrating a magnetic field with the start assisting member in one preferred embodiment being encapsulated in the bulb. The start assisting member is preferably disposed on a side of the bulb facing the feeding opening. The discharge start assisting member may have the shape of a wire or may be an electrically conductive member having a dielectric covering therearound. A space may be provided between the conductive member and the dielectric cover which is at a reduced pressure.

The light reflecting member may be formed with a pair of opposed cut-off sleeves into which a pair of supporting members of the bulb are inserted to support the bulb. The bulb may have the supporting members formed integrally therewith.

Preferably, the discharge light emissive substance encapsulated in the bulb is mercury of $7\times10^{-6}$ gram atom/cc to $60\times10^{-6}$ gram atom/cc, gallium of at least $1\times10^{-7}$ gram atom/cc and a halogen of $1.5\times10^{-7}$ to $50\times10^{-7}$ gram atom/cc. The bulb may be made of transparent quartz glass and should have an inner diameter such that a ratio of an outer surface area of the bulb to input microwave power is in a range of 1.5 to 15 $mm^2/W$. The weight of the discharge bulb with respect to the microwave input power should be no more than $3.0\times10^{-2}$ g/W. The microwaves generator may generate the microwave intermittently in which case the rest interval should be no more than 5 msec. The microwave generator may be a magnetron with a full-wave voltage doubler power supply used to drive the magnetron. The length of the waveguide should be selected such that the operation of the magnetron is within a phase width of a quarter wavelength with respect to a sink region of the magnetron immediately after the bulb is ignited.

BRIEF DESCRIPTION OF THE DRAWINGS

FIGS. 9 through 11 show a third embodiment of the present invention in which FIG. 9 is a cross section thereof, FIG. 10 is a cross section of the cavity portion thereof and FIG. 11 is an enlarged view of an essential portion thereof;

FIGS. 20 and 21 show a fifth embodiment of the present invention in which FIG. 20 is a circuit diagram of a power source of the microwave generator and FIG. 21 shows a microwave waveform generated by the microwave generator in FIG. 20; and FIGS. 22 and 23 show a sixth embodiment of the present invention in which FIG. 22 is an example of the Rieke disgram of a magnetron and FIG. 23 is a graph showing the impedance shift of the cavity thereof.

DESCRIPTION OF THE PREFERRED EMBODIMENTS

The present invention will be described in detail with reference to preferred embodiments thereof.

Figure 1:
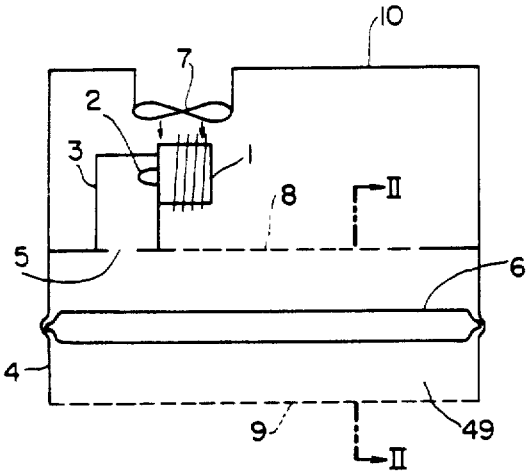
FIG. 1 is a cross section of the conventional microwave discharge light source.
Figure 2:
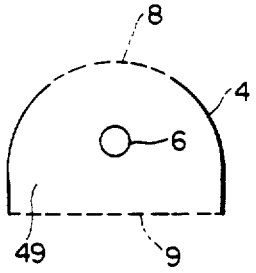
FIG. 2 is a cross section of the microwave discharge light source taken along a line II—II in FIG. 1.
Figure 3:
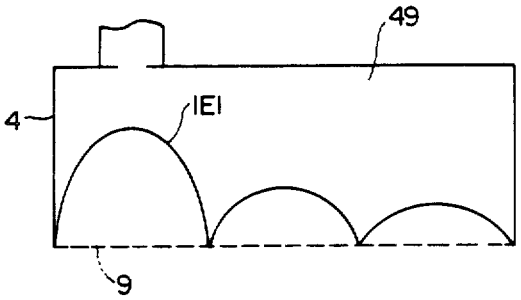
FIG. 3 shows a microwave electric field distribution in a cavity of the conventional microwave discharge light source.
Figure 4:
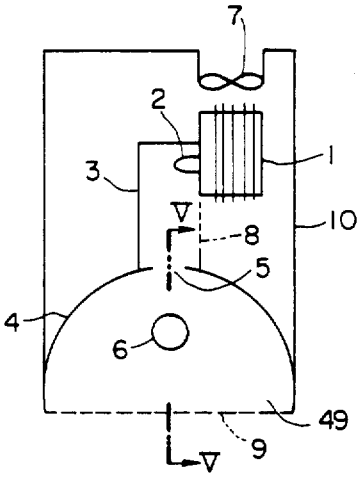
FIG. 4 is a cross sectional view of a preferred embodiment of the present invention.
Figure 5:
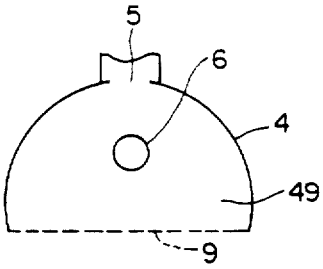
FIG. 5 is a cross section of the present microwave discharge light source taken along a line V—V in FIG. 4.

Describing a first embodiment with reference to FIGS. 4 and 5, the first embodiment includes a magnetron 1 equipped with a magnetron antenna 2, a waveguide 3 having one end connected to the magnetron 1 and the other end connected to a microwave feeding opening 5 formed in a wall of a light reflecting member 4 which is formed as a shell in the shape of a rotationally symmetrical cup or dome, and an envelope 10 housing these components. In the wall of the waveguide 3 are formed a plurality of air holes 8.

The microwave discharge light source apparatus further includes a spherical discharge bulb 6 of quartz glass which has no electrode and which has a sufficiently small size so as to make the light emissive portion thereof approximate a point light source. The bulb 6 is filled with mercury as a discharge photoemissive substance and argon gas as a starter noble gas and fixedly supported by the light reflecting member 4.

The magnetron 1 is cooled by air flow provided by a fan 7 supported by an upper wall of the envelope 10 and the open end of the cup shaped reflection member 4 is covered by a mesh plate 9 which is transparent to light but opaque to microwaves. The light reflecting member 4 forms together with the mesh plate 9, a resonance cavity 49 which serves as a resonator when the bulb 6 is lit.

In operation, when electric power is supplied to the magnetron 1, the magnetron 1 radiates microwave energy through the waveguide 3 and the feeding opening 5 into the microwave cavity 49. However, since the discharge bulb 6 is not ignited immediately after the start of microwave oscillation, the cavity 49 is in the non-resonance state and only a microwave electromagnetic field is established in the cavity 49 due to microwaves leaking from the feeding opening 5. Then, the discharge of the bulb 6 is started by the electromagnetic field. When the discharge of the bulb 6 is started, the cavity 49 becomes resonant and a resonance electromagnetic field is established therein. Sufficient microwave energy to maintain the discharge of the discharge bulb 6 is supplied by the resonance electromagnetic field.

Therefore, according to the invention, since the microwave cavity 49 acts as a resonator, it is possible to inject a sufficient amount of microwave energy into the small spherical discharge bulb so that the efficiency of the device is increased over prior art constructions. Since the shape of the discharge bulb 6 can be considered as a point source, it is possible to dispose it at a position within the cavity 49 where the variation of microwave electromagnetic field distribution is negligible. Therefore, unevenness of the discharge in the discharge bulb 6 is eliminated as is unevenness of light emission. Furthermore, since the light reflecting member 4 has a rotationally symmetrical shape, the manufacture thereof is very easy so that, in determining the shape of the cavity 49 serving as a resonator, which is quite difficult to do analytically, it is easy to select an optimum size by changing the size thereof experimentally.

If the mesh plate 9 is formed by, for example, etching a thin metal plate of a material such as a stainless steel plate having a thickness of 0.1 mm, the microwave loss thereof is much smaller than a mesh plate made of metal wire because there is contact between metal portions. Therefore, the microwave energy can be more effectively converted into discharge energy and thus the light emission efficiency is considerably improved.

Figure 6:
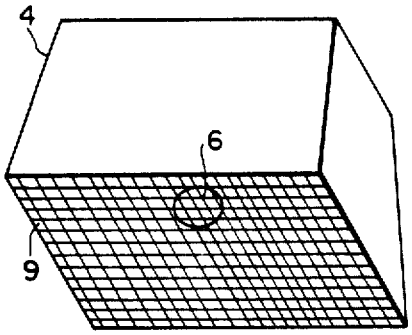
FIG. 6 is a perspective view of a modification of the cavity portion of the embodiment in FIG. 4.

Further, as shown in FIG. 6, it is possible to form the cavity 49 of the light reflecting member as a truncated pyramid. With this shape, a desired illumination distribution is obtained within the square area. In this case, the microwave electromagnetic field distribution is approximately in a square mode, while with the rotationally symmetrical cavity, the mode is approximately circular or cylindrical.

EMBODIMENT 2

Figure 7:
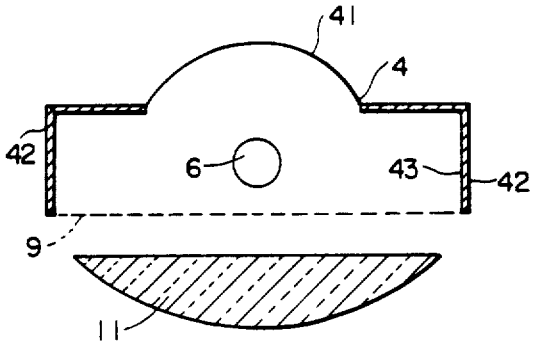
FIG. 7 is a cross section of a cavity of a second embodiment of the present invention.

A second preferred embodiment will be described with reference to FIG. 7 in which the same or similar components as those in FIG. 6 are depicted by the same reference numerals. A light control member 11 including a lens is disposed below a mesh plate 9 and a cavity 43 is formed by a reflecting member 41 having a center of curvature at the point at which the discharge bulb 6 is disposed and a wing portion 42 extending from the reflection member 41. An inner surface of the wing portion 42 is coated with graphite or provided with an anti-reflection layer 43 so that there is substantially no reflection from the inner surface of the wing portion 42. With this structure, in addition to the ease of cavity design, all of the light incident on the light control member 11 can be considered as emerging from the discharge bulb 6. Thus, it is possible to control the illumination distribution by suitably setting the light collection characteristics of the light control member 11.

The light control member 11 may be of the light scattering type and, regardless to say, it is to be capable of regulating the illumination distribution.

Figure 8:
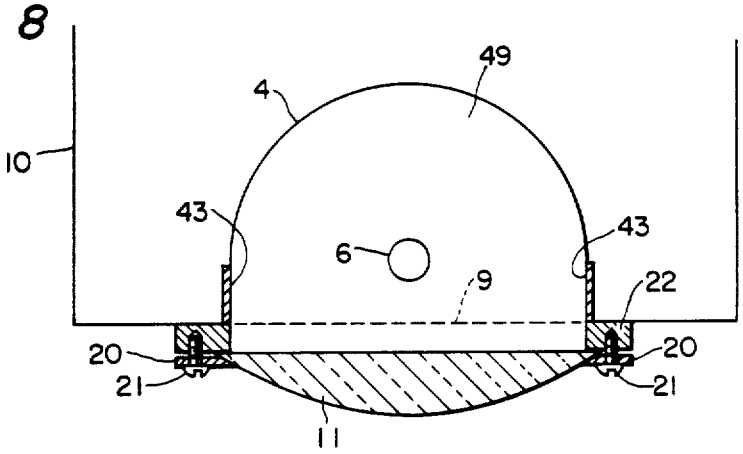
FIG. 8 is a cross section of a modification of the cavity of the second embodiment of the present invention.

Further, this embodiment can be modified as shown in FIG. 8. In FIG. 8, the light reflecting member 4 is rotationally symmetrical and has a peripheral portion inner surface which is provided with the light absorption layer 43 which may be a coated layer of a material such as graphite. The light control member 11 may be fixedly secured by screws 21 through an annular mounting plate 20 to the light reflecting member 4 with an annular spacer 22. With the modification of FIG. 8, the illumination distribution control of the illuminating area is performed in a similar manner to that in FIG. 7. In addition, since the cavity 49 can be formed as a resonance cavity by suitably determining the area where the light absorption layer 43 is provided, the ease of design is much improved.

EMBODIMENT 3

Figure 9:
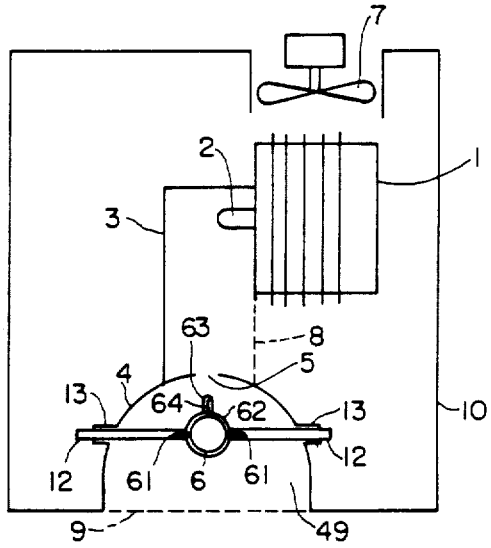
Figure 10:
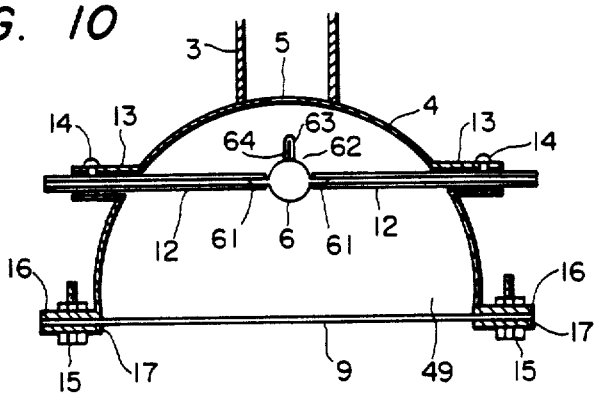
Figure 11:
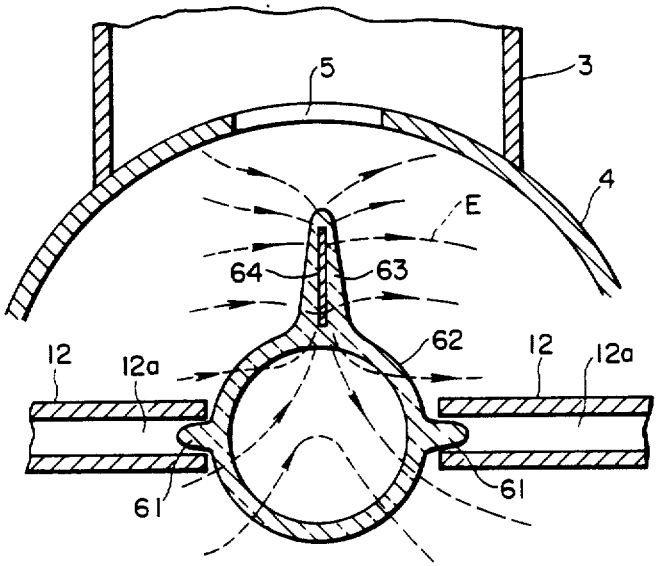

A third embodiment will be described with reference to FIGS. 9 through 11 of which FIG. 9 is a schematic cross-sectional illustration thereof. FIG. 10 is an enlarged view of the cavity portion thereof and FIG. 11 is a further enlarged view of the cavity portion. In these figures, the same reference numerals used in FIGS. 4 and 5 indicate the same or corresponding components as those used in FIGS. 4 and 5. Here, the electrodes discharge bulb 6 of quartz in the shape of a sphere is formed with a pair of quartz protrusions 61 extending from an outer surface 62 thereof oppositely. As before, the bulb 6 is filled with mercury and argon gas. The bulb 6 is further formed with a quartz tube 63 extending from the outer surface 62 thereof in which a start assisting member 64 in the form of a tantalum wire is encapsulated.

A mesh plate 9 which is transparent to light but opaque to microwave is fixed by bolts 15 between a flange portion 16 of the light reflecting member 4 formed by bending the peripheral edge thereof and an annular press plate 17 corresponding in shape to the flange portion 16 which covers the open end of the light reflecting member 4 to thereby define the microwave cavity 49.

Free ends of the protrusion 61 of the bulb 6 are inserted into inner ends of supporter cylinder 12 which is made of quartz. The outer ends of the supporter cylinder 12 are inserted into cut-off sleeves 13 formed on the outer surface of the light reflecting member 4 and supported thereby by stopper screws 14, respectively. The position of the bulb 6 supported in this way is determined such that when the bulb 6 is energized the cavity 49 becomes a resonator.

This arrangement can provide not only the same effects as provided by the first embodiment but also an effect that, due to the provision of the start assisting member 64, the intensity of the electromagnetic field around the opposite ends of the start assisting member 64 is quite high, as indicated by E in FIG. 11, and thus the electromagnetic field strength within the bulb 6 is higher than the discharge starting electromagnetic field strength even when the electromagnetic field strength within the cavity 49 immediately before the discharge starting of the bulb 6 is low thus assuring the ignition of the bulb 6 without increasing the microwave input energy. Further, the bulb 6 is easily detachable and positioning of the bulb 6 can be easily performed by merely adjusting the position of the supporting cylinder 12.

Furthermore, since the start assisting member 64 is embedded in the exhausted tube 63 of dielectric material such as quartz and the breakdown voltage of the dielectric material in a vacuum is much higher than in air, the possibility of discharge outside of the bulb 6 is such reduced and the possibility of melting the starting assisting member 64 is eliminated. The electromagnetic field distribution within the cavity 49 prior to the ignition of the bulb 6, i.e., in the state where impedance matching is not yet established, is most dense the near the feeding opening 5. Therefore, if the start assisting member 63 is positioned such that one end thereof is in the vicinity of the feeding opening 5, it is possible to further strengthen the electromagnetic field within the bulb 6 to thereby cause the discharge starting to be accomplished easier.

Further, since the impedance of the start assisting member 64 during stable discharge of the bulb 6 is negligible compared with the impedance of the bulb 6 itself, the existence of the start assisting member does not affect the stability of the operation of the bulb 6.

The length l of the cut-off sleeve 13 should be determined such that the leakage of microwaves from the cavity resonator is restricted to be at or below a level (1 mW/cm$^2$) at which there is no safety problem. The power density (P) of leaked microwaves can be expressed by the following equation:

$$P = \frac{P_o}{\tau\sigma} \exp(-2\alpha l).$$

where, $$\alpha = \frac{2\pi}{3.41a} \sqrt{1 - \left(\frac{3.41a}{\lambda}\right)^2 E_r} \text{ and } a < \lambda\sqrt{E_r}/3.41.$$

where $\lambda$ is the free space wavelength of the microwaves in centimeters, $P_o$ is microwave input energy in watts, a is the inner diameter of the cut-off sleeve 13 is centimeters and $E_r$ is the specific dielectric constant of the supporting member.

Therefore, in order to make the leakage power P equal to or smaller than 1 mW/cm$^2$, the length l must be equal to or longer than:

$$\frac{10 \log P_o - 20 \log a + 25}{16\sqrt{1 - \left(3.41 \frac{a}{\lambda} E_r\right)^2}} a$$

As a typical example, when $P_o$=1 kW, a=0.4 cm, $\lambda$=12.24 cm and $E_r$32 4, the length l should be 1.6 cm or longer.

Figure 12:
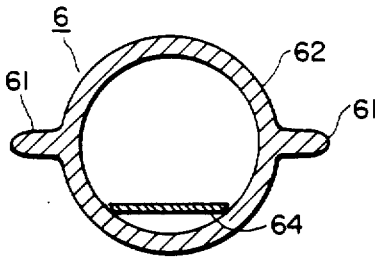
FIGS. 12 through 14 show modifications of the discharge bulb of the third embodiment of the present invention, respectively.
Figure 13:
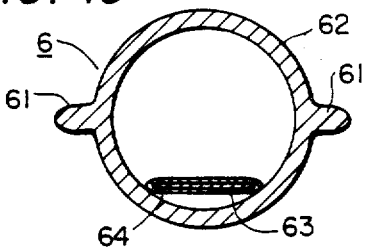
Figure 14:
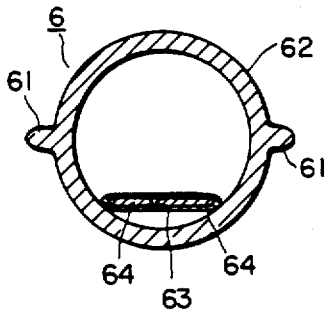

In the embodiment shown in FIGS. 9 through 10, the start assisting member 64 is embedded in the cylinder member 63 which protrudes from the outer surface of the discharge bulb 6. Alternatively, it may be housed directly in the discharge bulb 6 as shown in FIG. 12 or it may be covered by a dielectric material such as quartz to provide a reduced pressure atmosphere therefor so that the member 64 does not react with other materials filling the bulb 6 and then be housed in the bulb 6 as shown in FIG. 13. Alternatively, a pair of start assisting members 64 may be used for this purpose as shown in FIG. 14. In FIG. 14, a pair of start assisting members 64 are encapsulated and coupled in series by a common evacuated tube member 63 made of a dielectric material with opposing ends of the members 64 being slightly separated so that the electromagnetic field intensity is high around the space therebetween and the tube member 63 housed in the bulb 6.

Figure 15:
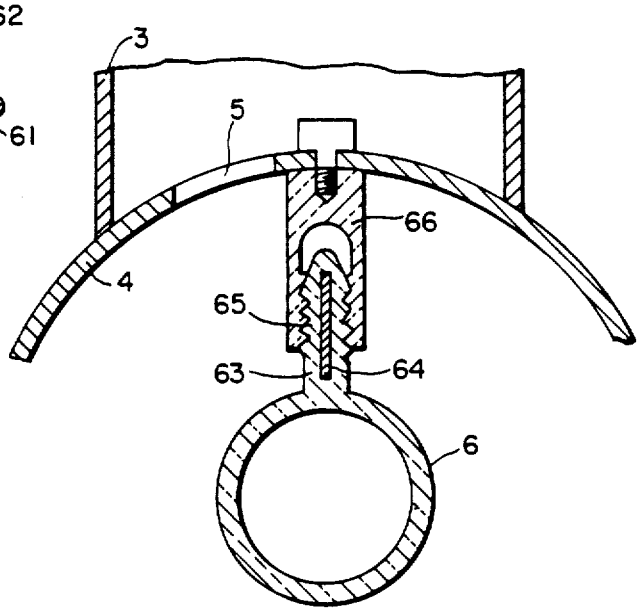
FIG. 15 is similar to FIG. 11, showing a modification of the third embodiment of the present invention.

FIG. 15 shows a modification of the discharge bulb 6 in which the supporting thereof is somewhat simplified. In FIG. 15, the cylinder member 63 in which the start assisting member 64 is positioned is used as a supporting portion thereof which is held by a corresponding supporting member provided around the feeding opening 5 of the light reflecting member 4. To this effect, a thread 65 is formed on the outer surface of the cylinder member 63 and a bulb support member 66 of the low loss dielectric material such as quartz glass having one end suitably fixed to the light reflecting member 4 and the other end threaded correspondingly to the thread 65 of the cylinder member 63 is provided. The discharge bulb 6 is fixedly supported by screwing the cylinder member 63 into the thread of the bulb supporting member 66. In this case, there is no need of providing the protrusions 61 and the cut-off sleeves 13 and therefore the manufacture of the device is considered quite simple.

EMBODIMENT 4-1

In accordance with a fourth embodiment, in addition to mercury used in the preceding embodiments, gallium is provided as a light emitting substance so that emitted light includes waves of the gallium atom spectrum of 403 nm and 417 nm as well as the mercury atom spectrum of 365 nm, 405 nm and 436 nm. The purpose of this embodiment is to make the apparatus of the present invention also applicable to an exposing light source for a diazo type photosensitive material which is sensitive to wavelengths of 403 nm and 417 nm. The discharge bulb 6 and the light reflecting member 4 used in this embodiment can be any of those of the preceding embodiments.

An actual device was assembled using the construction shown in FIGS. 4 and 5 with microwave output power of the magnetron 1 being 700 W and with the inner surface of the light reflecting 4 being completely covered by carbon black so as to eliminate the effects of reflection from the light reflecting member so that measurement could be made of only the direct light from the bulb 6. The materials filling the bulb 6 were mercury, gallium and iodine as a halogen. A light output having wavelengths from 350 nm to 450 nm was measured for bulbs containing various amounts of these materials.

Figure 16:
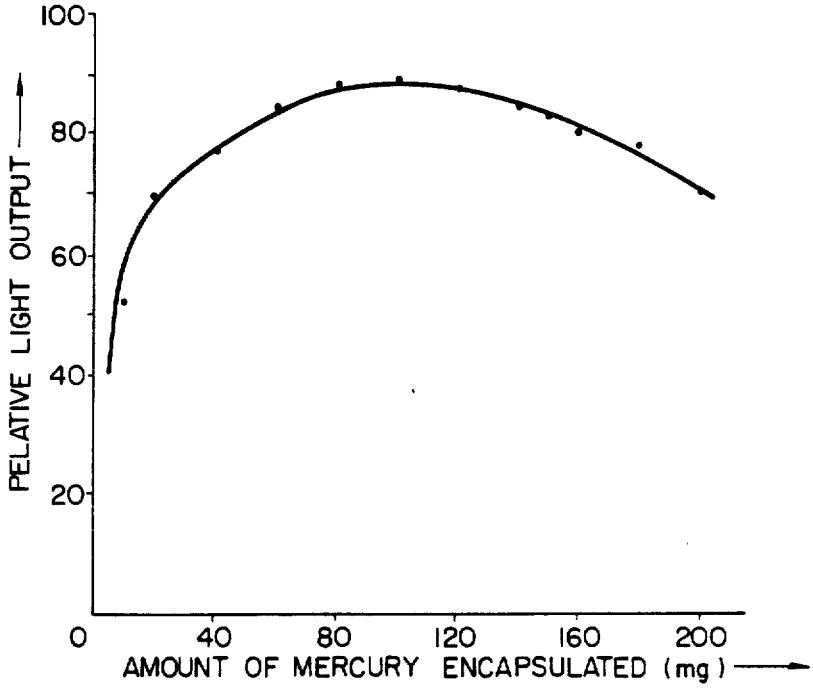
FIGS. 16 through 18 are graphs showing characteristic curves which are plots of the relative light output of a non-electrode, spherical discharge bulb 4 according to a fourth embodiment of the present invention.

FIG. 16 shows a plot of relative light output on the ordinate for wavelengths from 350 nm to 450 nm with respect to the amount of mercury encapsulated in the bulb 6 on the abscissa. Here, the inner diameter of the spherical discharge bulb 6 was 30 mm and the bulb 6 also contained argon gas at 60 mm Hg, 1 mg of gallium, 4 mg of mercury iodide and a variable amount of mercury. As will be clear from FIG. 16, when the amount of mercury is increased with the amounts of gallium and mercury iodide held constant, the light output reaches a maximum when the amount of mercury is about 100 mg. The arc is stable up to mercury amounts of about 150 mg and then the light emission becomes unstable with larger amounts. This may be considered due to the fact that when the amount of mercury is increased beyond 150 mg, the mercury vapor pressure in the discharge bulb 6 becomes saturated and the excess amount of mercury is deposited on the inner wall of the discharge bulb 6. This phenomenon can also be observed when the amount of mercury is varied with the amounts of gallium and mercury iodine being other constant values.

EMBODIMENT 4-2

Figure 17:
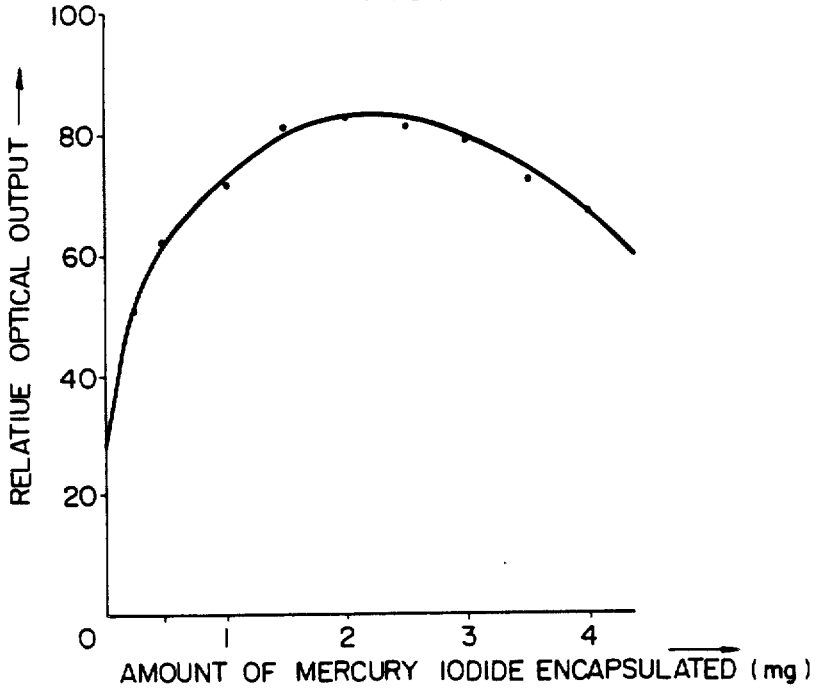

FIG. 17 shows a plot of relative optical output of the discharge bulb 6 in a wavelength range from 350 nm to 450 nm with the amount of mercury iodide on the abscissa for a case where the spherical bulb 6 has an inner diameter of 30 mm and contains argon gas at 60 mmHg, 60 mg of mercury, 0.5 mg of gallium and various amounts of mercury iodide. As is clear from FIG. 17, the light output of the bulb 6 increases substantially with increased amounts of mercury iodide reaching a maximum when the amount of mercury iodide is about 2 mg, i.e., when the atom ratio of gallium to iodide is around 1:1.2. With a further increase in the amount of mercury iodide, the output decreases gradually. This tendency can also be observed when the amount of mercury iodide is varied while the amounts of mercury and gallium are other constant values. It has been observed that the maximum light output is obtained when the gallium to mercury iodide ratio is 1:4, i.e., for a gallium atom to iodide atom ratio of about 1:1.2.

EMBODIMENT 4-3

Figure 18:
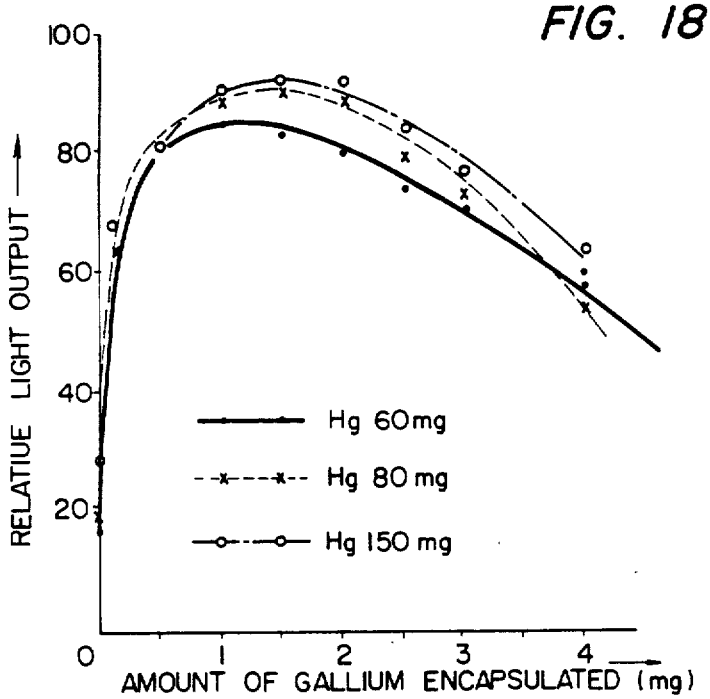

FIG. 18 shows plots of relative light outputs in a wavelength range from 350 nm to 450 nm of three spherical discharge bulbs 6 which have an inner diameter of 30 mm and which contain argon gas at 60 mmHg and a variable amount of a mixture of gallium and mercury iodide with fixed ratio of 1:4 together with mercury in amounts of 60 mg, 80 mg and 150 mg. As is clear from FIG. 18, regardless of the amount of mercury, the light output increases with an increased amount of the mixture and becomes a maximum with the amount of gallium at about 0.5 mg to about 2.0 mg and then decreases with a further increase of gallium. When the amount of gallium is increased beyond 2.5 mg, i.e., when the amount of mercury iodide is greater than 10 mg, the arc becomes astable even when there is no residual mercury. This may be considered as due to the fact that iodine in the arc affects the latter adversely. This is confirmed by the fact that when only the amount of gallium is increased with the amount of mercury iodide restricted to be 10 mg or less, there is no turbulence of the arc while gallium is deposited on a portion of the inner wall of the bulb in operation.

It will be clear from a consideration of Embodiments 4-1 through 4-3 that in order to obtain an intense light output in a wavelength range of from 350 nm to 450 nm by using microwave excitation, a non-electrode discharge light source having a spherical discharge bulb having an inner diameter of 30 mm with amounts of mercury, gallium and mercury iodide encapsulated in the bulb of 20 mg to 170 mg, 1510 mg, 0.1 mg or more and 0.5 mg to 15 mg, respectively, should be used. These values can be represented in gram atomic weight per unit inner volume of the bulb as $7\times10^{-6}$–$60\times10^{-6}$, $1\times10^{-7}$ or more and $1.5\times10^{-7}$ to $50\times10^{-7}$, respectively. In this case, mercury iodide includes mercury of $0.75\times10^{-7}$ to $25\times10^{-7}$ gram atomic weight/cc. However, since the amount of mercury contained in the mercury iodide is very small in comparison with the required amount of mercury, that amount may be considered negligible. It should be noted again that, with these substances except for gallium, with less than the specified values, it is impossible to obtain a required light output and in, the specified wavelength range with these substances, except for gallium if greater quantities are used, the light output decreases and the arc becomes astable. As to the amount of gallium, since it does not become halogenized gallium and the saturating vapor pressure of metal gallium at the temperature of the inner wall of the operating bulb is low, metal gallium which is not converted into gallium iodide is deposited on the bulb inner wall. However, since this metal gallium does not affect the arc adversely, there is no need of defining of an upper limit on the amount thereof.

Although the above Embodiments 4-1 to 4-3 relate specifically to a spherical bulb having an inner diameter of 30 mm, substantially the same results can be obtained by using a bulb having an inner diameter of 20 mm to 50 mm. However, with a bulb having an inner diameter smaller than 20 mm and for a microwave input of 700 W, the bulb tends to break within a short time due to the high temperature even if the amount of cooling air is increased. On the contrary, with a bulb having an inner diameter larger than 55 mm, the temperature of the bulb wall will be too cool even if the cooling air supply is stopped and thus it is impossible to obtain the necessary vapor pressures of the substances encapsulated in the bulb in operation resulting in a reduced light output. Therefore, in order to obtain a required light output within the desired wavelength range, it is preferable to select the surface area of the bulb per unit microwave input within the range from 1.5 $mm^2/W$ to 15 $mm^2/W$. This range is also preferable for Embodiments 1 to 3 in which only mercury is used as the discharge emissive substance.

EMBODIMENT 4—4

Figure 19:
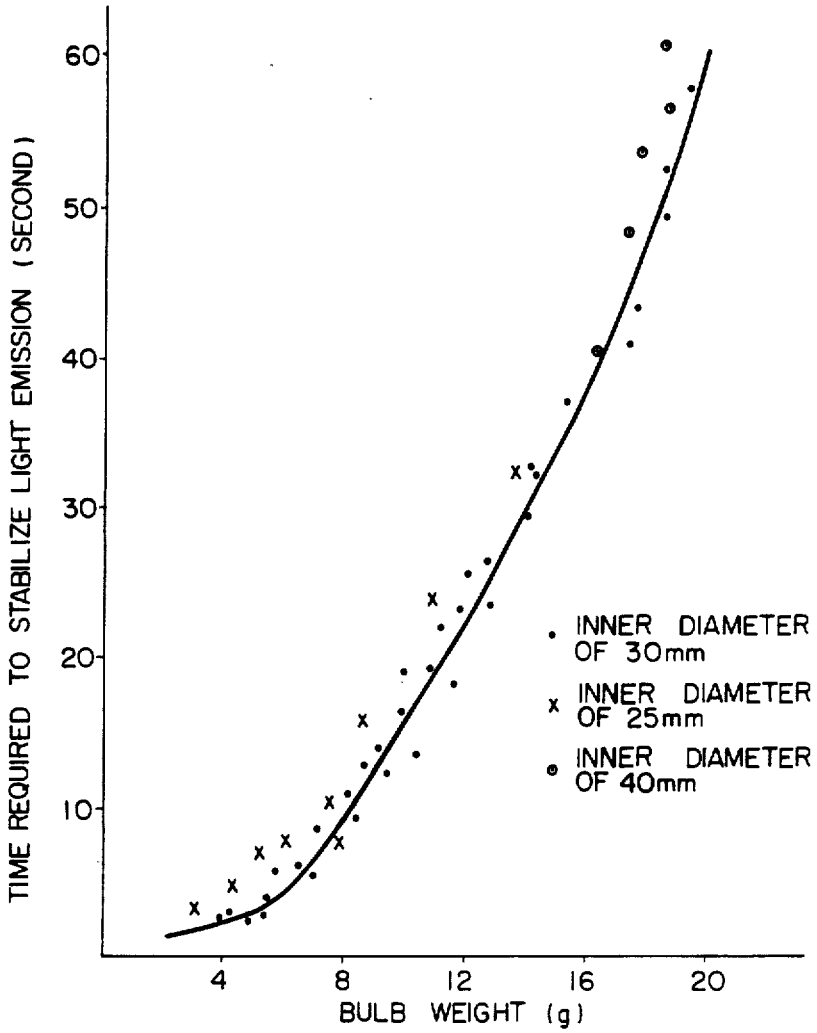
FIG. 19 is a graph showing a relation of the weight of the non-electrode spherical discharge bulb of the fourth embodiment to a light amount stabilizing time at the start of discharge.

FIG. 19 shows plots of time required to stabilize the light emission of spherical bulbs 6 having an inner diameter of 30 mm for different wall thicknesses, and hence total bulb weights, for bulbs containing argon at 60 mmHg, 80 mg of mercury, 1 mg/gallium, and 4 mg of mercury iodide. The graph of FIG. 19 also contains similar plots of the time required to stabilize the light emission of bulbs having inner diameters of 25 mm and 40 mm, respectively, with each bulb containing suitable amounts of argon, mercury, gallium and mercury iodide in the same ratio as the 30 mm diameter bulb to establish the same physical and chemical conditions within the bulbs for comparison purposes. In this embodiment, the stabilizing time required to stabilize the light output is defined as the time until the light output reaches 80% of the light output after the bulb is completely stabilized.

As is clear from FIG. 19, the stabilizing time increases substantially linearly with increases of bulb weight beyond about 4 g, while for weights of less than 4 g, the effect of shortening the stabilizing time is not substantial.

With a bulb weight greater than 20 g, the stabilizing time becomes longer than 1 minute and thus the merit of a microwave discharge light source apparatus having a short stabilizing time disappears. It should be noted that the data shown in FIG. 19 was obtained by a magnetron having a microwave output of 700 W. Since the stabilizing time depends mainly upon the correlation between the microwave output and the thermal capacity of the transparent quartz glass forming the outer wall of the bulb, a larger the microwave input to the bulb results in a shorter stabilizing time which is proportional to the thermal capacity of the quartz glass forming the outer wall of the bulb 6. Therefore, in order to restrict the stabilizing time within desirable limits, the weight of the bulb 6 for a given microwave input thereto should be set within predetermined limits. For example, a stabilizing time shorter than 1 minute can be obtained with a bulb 6 having a weight of about $3.0\times10^{-2}$ g/W or lighter. This is also applicable to Embodiments 1-3 which are bulbs containing only mercury as emission substance.

EMBODIMENT 5

A specific circuit of a power source for the magnetron 1 used in the Embodiments 1 to 4 will now be described with reference to FIG. 20.

Figure 20:
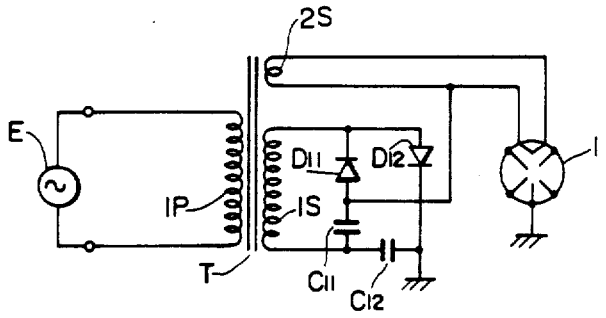

In FIG. 20, a transformer T has a primary winding 1P connected across an A-C supply E and a secondary winding 1S is connected in parallel with a series circuit of a capacitor $C_{11}$ and a diode $D_{11}$. A series circuit of a capacitor $C_{12}$ and a diode $D_{12}$ is connected in parallel with the series connection of the capacitor $C_{11}$ and diode $D_{11}$. The capacitors $C_{11}$ and $C_{12}$ and diodes $D_{11}$ and $D_{12}$ form a full wave voltage doubler rectifier whose output voltage is applied to an anode of the magnetron 1. The transformer T has a further secondary winding 2S having terminals connected to a cathode of the magnetron 1.

Figure 21:
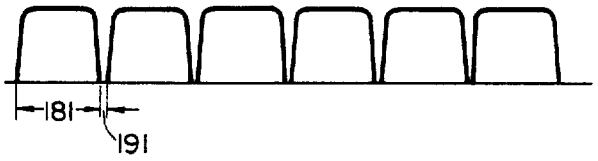

By using the full-wave voltage doubler rectifier circuit shown in FIG. 20, it is possible to restrict the rest period of microwaves to 5 msec or shorter economically. Further, if a leakage transformer is used as the transformer T, a microwave output having a waveform shown in FIG. 21 can be obtained. In FIG. 21, a time period 181 is a microwave generating period and a time period 191 is the microwave rest period. When this rest period 191 is on the order of 1 msec, the ionized gas does not extinguish so that a discharge can be restarted immediately thereafter. Thus, there is no termination of discharge so long as the rest period is sufficiently short.

Since with the circuit of FIG. 20 the rest period can be made 5 msec or shorter by using a full-wave voltage doubler rectifier and a leakage transformer for applying the anode voltage to the diode of the magnetron 1, there is no termination of discharge caused by a longer rest period. This is another important effect of the present invention in comparison with a conventional power source for a magnetron 1 using a half-wave voltage doubler rectifier in which the rest period is usually 8 to 10 msec and for which there is a disadvantage that the discharge may stop after a period of several to several tens of seconds after discharge initiation depending on the types of metals encapsulated in the discharge bulb 6. This phenomenon of the conventional power supply can be considered to be due to the fact that since the metals encapsulated in the bulb are vaporized and the metal gas atom density in the bulb after the discharge commences is high so that the amount of energy derived from the microwave energy injected into the bulb before collision of electrons with atoms is small, the ionization probability is lowered below a level necessary to maintain the discharge. Further, the prior art power supply used to drive the magnetron to thereby cause it generate microwaves continuously is expensive. As to the microwave generator itself, there is a disadvantage that if it first generates microwaves continuously and then the operation thereof is shifted to the sink region, it is very difficult to recover the normal operation. There is no such defect in the apparatus of the invention.

Although the circuit of FIG. 20 has been described as being used with a single magnetron 1, it is possible to use a pair of magnetrons for this purpose. In such a case, the magnetrons may be driven by power supplies having half-wave voltage doubler rectifies shifted in phase by 180° with respect to each other.

EMBODIMENT 6

In the microwave discharge light source apparatus of any of Embodiments 1 to 4, it is advantageous to further shorten the stabilizing time from the discharge initiation of the discharge bulb 6 through the metal gas discharge to the stabilized discharge state. The stabilizing time depends upon the evaporation rate of the metal encapsulated in the bulb 6 and that rate, in turn, depends upon the rate of temperature increase of the inner wall of the bulb 6. An increase of the temperature increase rate can be brought about by a larger discharge energy, i.e., microwave energy.

In view of these facts, as well as the operational characteristics of the magnetrons, it has been found that a shortening of the stabilizing time can be achieved by suitably selecting the length of the waveguide 3.

Figure 22:
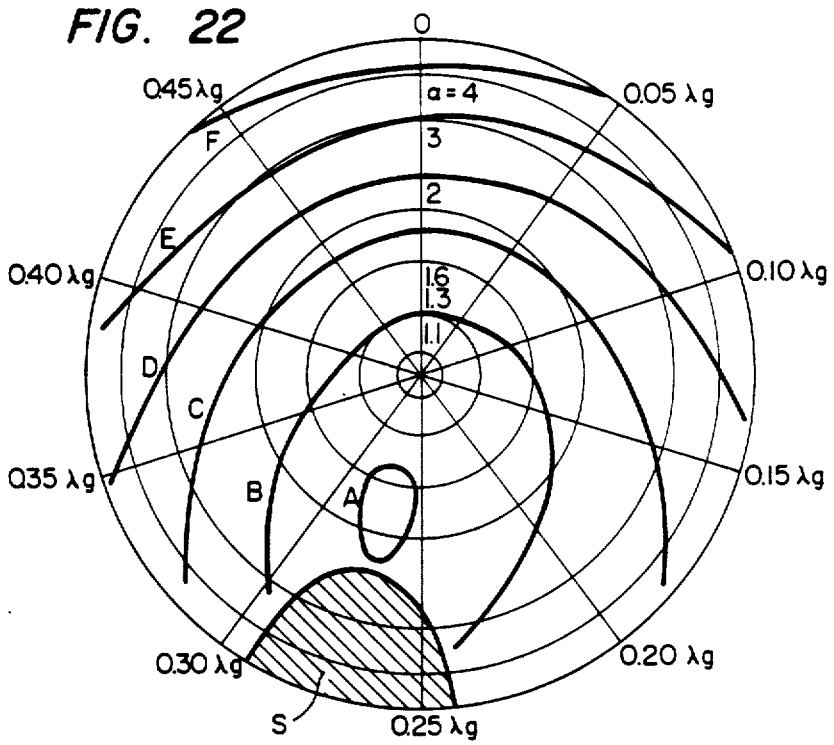

In general, the operation of the magnetron can be represented by a Rieke diagram on an impedance chart as shown in FIG. 22. In FIG. 22, the distance from the center of the chart and the angular position respectively represent the microwave reflection coefficient $\sigma$ and the phase. Lines A to F are equi-output power lines of the oscillation output of the magnetron with the line A corresponding to the highest output power line and with the output gradually decreasing toward the line F. $\sigma$ indicates the sink region of the magnetron where the oscillation thereof becomes abnormal.

Figure 23:
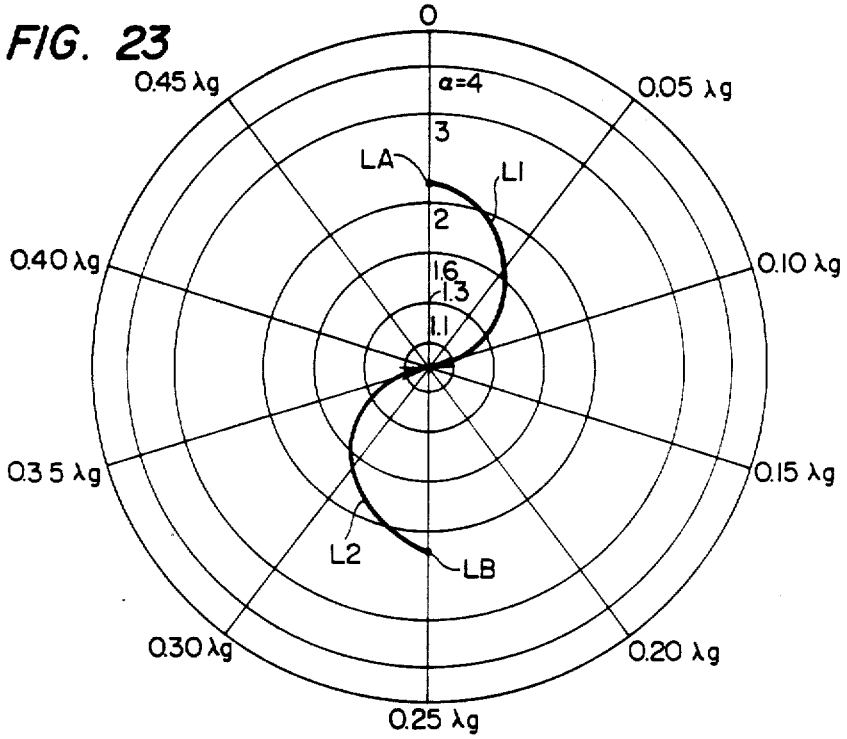

FIG. 23 shows an example of the impedance of the cavity 4 after the discharge bulb 6 is ignited. The impedance of the cavity immediately after the bulb is ignited is indicated by a point LA. After the ignition, the impedance of the cavity 4 varies with variations of the discharge state due to vaporization of the metals in the bulb becoming constant in the stable state. By matching the impedance, i.e., regulating the resonance frequency of the cavity and the dimensions of the feeding opening such that the characteristic impedance is at the center of the impedance chart, the impedance varies from the point LA through L to the center of the chart.

As mentioned above, the output power of the magnetron 1 is largest at the side of the sink region. Therefore, by making the load impedance (here, the cavity impedance) seen from the magnetron 2 larger at the sink side, a greater amount of microwave energy can be provided. When the waveguide 3 is connected to the cavity 4, the impedance seen from the free end of the waveguide 3 becomes equal to the cavity impedance rotated around the center of the impedance chart by an angle corresponding to the length of the waveguide 3. Therefore, in order to position the line $L_1$ in FIG. 23 at the sink side in FIG. 22 by rotation, a line $L_2$ may be obtained by rotating the line $L_1$ by, for example, 0.25 $\lambda g$, where $\lambda g$ is the wavelength of the waveguide 3. That is, the length of the waveguide 3 may be 0.25 $\lambda g$. As is clear from FIG. 23, the same effect can be obtained by selecting the length of the waveguide to be $0.25\ \lambda g + n \times 0.5\ \lambda g$ where n is an integer because 0.5 $\lambda g$ corresponds to one complete rotation of the line $L_1$.

Accordingly, in this example, by varying the length of the waveguide 3 between the cavity 4 and the magnetron 1, the load impedance for the magnetron 1 varies along the line $L_2$ so that the magnetron output power follows the lines A-B shown in FIG. 22 resulting in a larger output power. Therefore, the stabilizing time can be shortened.

The above description relates to the case where the cavity impedance is moved from the point LA along the line $L_1$. However, the same is also applicable to other impedance conditions of the cavity which may depend on the shape of the cavity, the position of the discharge bulb therein and the content of the bulb, etc. In any case, the length of the waveguide is to be selected so as to meet these conditions. It should be noted that, generally, the magnetron output is large where the operating point thereof is at a position within a quarter wavelength phase width of the waveguide on the sink side and therefore the length of the waveguide can be determined by the latter condition.

In the microwave generated plasma light source apparatus described with reference to Embodiments 1 to 6, it is possible to use a small discharge bulb 6 and thus the microwave power per unit surface area of the bulb 6 can be made large even if the microwave power supplied thereto is relatively small resulting in a high light emission efficiency. For example, a magnetron having a small output, such as magnetron used for an electronic cooking range for home use, may be utilized for this purpose.

As mentioned hereinbefore, the microwave generated plasma light source apparatus according to the present invention includes a microwave generator, a microwave cavity serving as a resonance cavity having a light reflecting member and a member transparent to light and but opaque to microwaves, a waveguide for guiding microwave generated by the microwave generator to a feeding opening of the cavity, and a small non-electrode discharge bulb which is disposed in a position in the cavity such that the cavity operates as a resonant cavity at least when the bulb is lit with the bulb being sufficiently small that it can be approximated as a point light source and discharge light emissive substances therein are encapsulated therein. With this construction, it is possible to supply microwaves to the bulb efficiently, the optical design is facilitated and a illumination distribution in achieved or another desired illumination distribution can be provided.

Particularly, if gallium is added as the discharge emissive substance to the discharge bulb, the light emission characteristics of the light source apparatus are suitable for use in a photographic plate making which requires a highly uniform illumination distribution in a specific area.

The light source apparatus of the invention can be used also as a light source such as a spotlight source, which requires a small light source of high output, by modifying the shape of the light reflecting member constituting the microwave resonance cavity.

What is claimed is:

1. A microwave generated plasma light source apparatus comprising: a microwave generator; a microwave cavity having a light reflecting member forming at least a portion of said cavity, said microwave generator being coupled through a feeding opening in said cavity to said cavity; a member transparent to light and opaque to microwaves disposed across an opening of said cavity opposite said feeding opening; a waveguide for guiding microwaves generated by said microwave generator to said feeding opening of said cavity; and an electrodeless discharge bulb disposed at a position in said cavity such that said cavity operates as a resonant cavity at least when said bulb is emitting light, said bulb encapsulating at least one discharge light emissive substance and having a shape and being sufficiently small that said bulb functions substantially as a point light source, said bulb being made of transparent quartz glass and having an inner diameter such that a ratio of an outer surface area of said bulb to the microwave input power is from 1.5 $mm^2/W$ to 15 $mm^2/W$, the weight of said bulb with respect to the microwave input power being no more than $3.0\times10^{-2}$ g/W, said microwave generator comprising means for generating microwaves intermittently with a rest interval of no more than 5 msec.

2. The microwave generated plasma light source apparatus as claimed in claim 1 wherein said light reflecting member comprises a light reflecting shell having rotational symmetry.

3. The microwave generated plasma light source apparatus as claimed in claim 1 wherein said light reflecting member comprises a center reflecting shell having at least a portion thereof of the same shape as said bulb and having a wing portion extending from a peripheral edge of said center reflecting shell, an inner surface of said wing portion being non-reflective to light.

4. The microwave generated plasma light source apparatus as claimed in claim 1 further comprising lens means for one of collecting and scattering light passing through said member transparent to light and opaque to microwaves.

5. The microwave generated plasma light source apparatus as claimed in claim 1 wherein said non-electrode discharge bulb comprises an electrically conductive discharge start assisting member disposed at least in the vicinity of said bulb for concentrating a magnetic field.

6. The microwave generated plasma light source apparatus as claimed in claim 5 wherein said electrically conductive discharge start assisting member is encapsulated in said bulb.

7. The microwave generated plasma light source apparatus as claimed in claim 5 wherein said discharge start assisting member is disposed on a side of said bulb facing said feeding opening.

8. The microwave generated plasma light source apparatus as claimed in claim 5 wherein said discharge start assisting member is in the shape of wire.

9. The microwave generated plasma light source apparatus as claimed in claim 5 wherein said start assisting member comprises an electrically conductive member and a dielectric cover covering said electrically conductive member.

10. The microwave generated plasma light source apparatus as claimed in claim 9 wherein a space is provided between said conductive member and said dielectric cover, said space being at a reduced pressure.

11. The microwave generated plasma light source apparatus as claimed in claim 1 wherein said light reflecting member is formed with a pair of opposed cutoff sleeves into which a pair of supporting members of said bulb are inserted to support said bulb.

12. The microwave generated plasma light source apparatus as claimed in claim 11 wherein said bulb has said supporting members integrally formed therewith.

13. The microwave generated plasma light source apparatus as claimed in claim 1 wherein said discharge light emissive substance encapsulated in said bulb comprises mercury of $7\times10^{-6}$ gram atom/cc to $60\times10^{-6}$ gram atom/cc, gallium of at least $1\times10^{-7}$ gram atom/cc and halogen of $1.5\times10^{-7}$ to $50\times^{-7}$ gram atom/cc.

14. The microwave generated plasma light source apparatus as claimed in claim 1 wherein said microwave generator comprises a magnetron and full-wave voltage doubler power supply means for driving said magnetron.

15. The microwave generated plasma light source apparatus as claimed in claim 1 wherein the length of said waveguide is selected such that the operation of said magnetron is within a phase width of a quarter wavelength with respect to a sink region immediately after said bulb is ignited.

*16. A microwave generated plasma light source apparatus comprising: a microwave generator; a microwave cavity having a light reflecting member forming at least a portion of said cavity, said microwave generator being coupled through a feeding opening in said cavity to said cavity; a member transparent to light and opaque to microwaves disposed across an opening of said cavity; a waveguide for guiding microwaves generated by said microwave generator to said feeding opening of said cavity; and an electrodeless discharge bulb disposed at a position in said cavity such that said cavity operates as a resonant cavity at least when said bulb is emitting light, said bulb encapsulating at least one discharge light emissive substance and having a substantially spherical shape and being sufficiently small that said bulb functions substantially as a point light source, said bulb being made of transparent quartz glass and having an inner diameter such that a ratio of an outer surface area of said bulb to the microwave input power is not more than 15 $mm^2/W$, the weight of said bulb with respect to the microwave input power being no more than $3.0\times10^{-2}g/W$, said microwave generator comprising means for generating microwaves intermittently with a rest interval of no more than 5 msec.*

*17. The microwave generated plasma light source apparatus as claimed in claim 16 wherein said light reflecting member comprises a light reflecting shell having rotational symmetry.*

*18. The microwave generated plasma light source apparatus as claimed in claim 16 wherein said light reflecting member comprises a center reflecting shell having at least a portion thereof of the same shape as said bulb and having a wing portion extending from a peripheral edge of said center reflecting shell, an inner surface of said wing portion being non-reflective to light.*

*19. The microwave generated plasma light source apparatus as claimed in claim 16 further comprising lens means for one of collecting and scattering light passing through said member transparent to light and opaque to microwave.*

*20. The microwave generated plasma light source apparatus as claimed in claim 16 wherein said electrodeless discharge bulb comprises an electrically conductive discharge start assisting member disposed at least in the vicinity of said bulb for concentrating a magnetic field.*

*21. The microwave generated plasma light source apparatus as claimed in claim 20 wherein said electrically conductive discharge start assisting member is encapsulated in said bulb.*

*22. The microwave generated plasma light source apparatus as claimed in claim 20 wherein said discharge start assisting member is disposed on a side of said bulb facing said feeding opening.*

*23. The microwave generated plasma light source apparatus as claimed in claim 20 wherein said discharge start assisting member is in the shape of wire.*

*24. The microwave generated plasma light source apparatus as claimed in claim 20 wherein said start assisting member comprises an electrically conductive member and a dielectric cover covering said electrically conductive member.*

*25. The microwave generated plasma light source apparatus as claimed in claim 24 wherein a space is provided between said conductive member and said dielectric cover, said space being at a reduced pressure.*

*26. The microwave generated plasma light source apparatus as claimed in claim 16 wherein said light reflecting member is formed with a pair of opposed cutoff sleeves into which a pair of supporting members of said bulb are inserted to support said bulb.*

*27. The microwave generated plasma light source apparatus as claimed in claim 26 wherein said bulb has said supporting members integrally formed therewith.*

*28. The microwave generated plasma light source apparatus as claimed in claim 16 wherein said discharge light emissive substance encapsulated in said bulb comprises mercury of $7\times10^{-6}$ gram atom/cc to $60\times10^{-6}$ gram atom/cc, gallium of at least $1\times10^{-7}$ gram atom/cc and halogen of $1.5\times10^{-7}$ to $50\times10^{-7}$ gram atom/cc and halogen of $1.5\times10^{-7}$ to $50\times10^{-7}$ gram atom/cc.*

*29. The microwave generated plasma light source apparatus as claimed in claim 16 wherein said microwave generator comprises a magnetron and full-wave voltage doubler power supply means for driving said magnetron.*

*30. The microwave generated plasma light source apparatus as claimed in claim 16 wherein the length of said waveguide is selected such that the operation of said magnetron is within a phase width of a quarter wavelength with respect to a sink region immediately after said bulb is ignited.*

*31. The microwave generated plasma light source apparatus as claimed in claim 16 wherein said microwave cavity has a rotationally symmetrical shape.*

*32. The microwave generated plasma light source apparatus as claimed in the claim 16 wherein said microwave cavity has at least one spherical surface portion whose center is common to the center of said bulb.*

*33. The microwave generated plasma light source apparatus as claimed in claim 32 further comprising lens means disposed before said light transparent member.*

*34. The microwave generated plasma light source apparatus as claimed in claim 16 wherein said opening of said cavity across which said member transparent to light and opaque to microwaves is disposed is located opposite to said feeding opening.*

* * * * *